Figure 1:
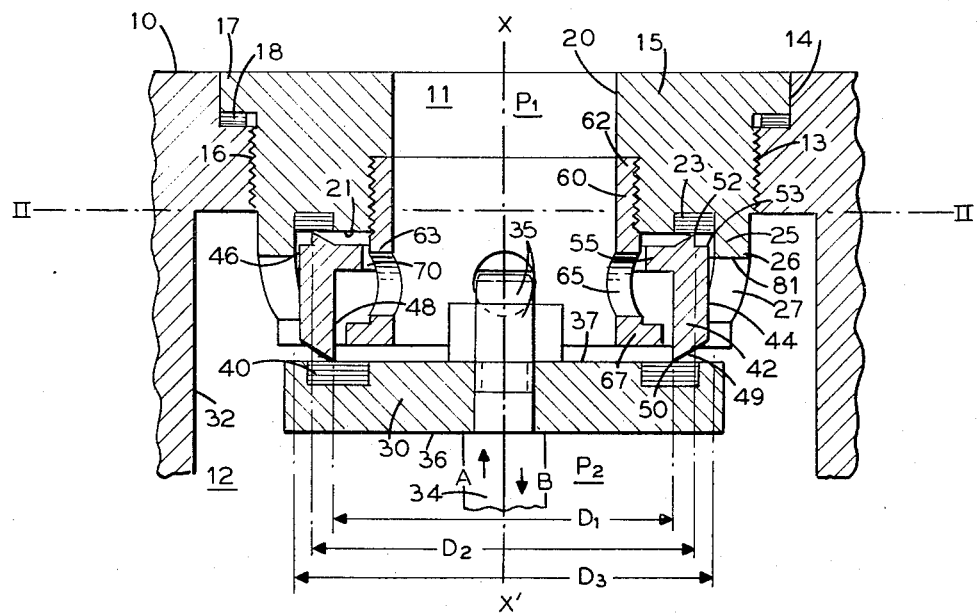

United States Patent [19]
Jacquemard

[11] 3,783,896
[45] Jan. 8, 1974

[54] VALVE MECHANISM FOR THROTTLING A FLOWING FLUID

[75] Inventor: Raymond Jacquemard, Paris, France

[73] Assignee: Compteurs-Schlumberger, Montrouge, France

[22] Filed: Mar. 30, 1972

[21] Appl. No.: 239,443

[30] Foreign Application Priority Data
Apr. 2, 1971 France .............................. 7111719

[52] U.S. Cl. .......................................... 137/630.14
[51] Int. Cl. ............................................... F16k 1/52
[58] Field of Search ..................... 137/630, 630.11, 137/630.14, 630.22

[56] References Cited
UNITED STATES PATENTS

| | | | |
|---|---|---|---|
| 3,618,893 | 11/1971 | Bois | 137/630.22 X |
| 2,085,487 | 6/1937 | Wagner | 137/630.14 X |
| 2,200,226 | 5/1940 | Larson | 137/630.14 |

Primary Examiner—Robert G. Nilson
Attorney—William R. Sherman et al.

[57] ABSTRACT

According to an illustrative embodiment, a mechanism is provided for throttling a fluid flowing through an opening in a body between two regions at different pressures. A first and a second throttling flow paths are provided through said opening by means of a valve member movable between a first and a second position. First seal means are provided around this opening for sealingly engaging such valve member in the first position thereof to close the first flow path. This first flow path is opened by movement of the valve member toward its second position for throttling a first flow of fluid. Means movable with the valve member between the first and second positions thereof are also provided for controlling the displacement of the valve member, the pressure difference between the two regions acting to urge the valve member into sealing engagement with second seat means carried by the movable controlling means, between the first and up to the second position of the valve member. A tubular extension surrounding the opening has lateral throttling apertures formed therein the lateral wall of the valve member is arranged to progressively uncover larger portions of the apertures when moving from first to second position, thus varying the section of the first flow path in a non-linear manner with the displacement of the valve member. Abutment means are provided to maintain the valve member in its second position whereby the second flow path opens upon movement of the controlling means with respect to the valve member in the section position, the flow throttling section of such second flow path varying linearly with the latter movement.

10 Claims, 2 Drawing Figures

PATENTED JAN 8 1974

3,783,896

VALVE MECHANISM FOR THROTTLING A FLOWING FLUID

The present invention relates to valve mechanisms particularly for valves, pressure regulators, pressure reducers, or other similar apparatus which are used to throttle a fluid flowing from one region to another at a lower pressure.

Mechanisms are known for mounting on a fluid conduit which provides a throttling effect on the flow of fluid circulating in such conduit between a fixed seat and a movable valve member. In these mechanisms the flow section S varies as a function of the displacement Z of the movable valve member according to a linear relationship $S=KZ$ throughout the whole length of the travel of this valve member.

There are instances where such a linear variation may be troublesome. For example, with conventional devices of the prior art, the variation of the flow section for a relatively small displacement of the movable member in the vicinity of the closing point of the valve member is often too large to provide a sufficient throttling effect for small flow rates. This may bring about an undesirable pulsing phenomenon and more generally results in a lack of accuracy of the pressure regulation.

It might thus be desirable in some cases to design a valve mechanism wherein incremental displacements of the movable valve member from a closed position in sealing engagement with a fixed seat produce at first very small variations of the flow section S and then, as such displacement increase, provide larger and larger variations of the flow section. Ultimately, it may even be desirable to come to a linear relationship between flow section and displacement when a predetermined value of the displacement Z of the valve member has been reached.

Indeed, it can be understood that, for a given accuracy in controlling the displacement of the movable parts of the system, the corresponding error in the section S of the flow path in the vicinity of the closing point can become quite important relative to this flow section.

It is an object of the invention to provide a valve mechanism wherein the flow section through which a flowing fluid is throttled varies according to a desired non-linear function with the displacement of a movable valve member controlling such flow section.

It is another object of the invention to provide a valve mechanism providing a small throttling fluid flow section S upon opening of a movable valve member from the closed position thereof, which section enlarges at an increasing rate with further displacements of such movable member.

It is a further object of the invention to provide a valve mechanism which is designed to obtain a constant rate of increase of the total throttling section S for a fluid flowing therethrough for any given unit increase in the opening displacements of a movable valve member controlling such flow section.

It is another object of the invention to provide a valve mechanism which is effective for throttling a flowing fluid over the whole range of flow variation including rates of flow near zero. Still, a further object of the invention is to provide a flexible and accurate valve mechanism of simple construction and capable of throttling a flow of fluid according to a given predetermined relationship between the flow section and the displacement of movable means controlling this section.

In accordance with the invention a valve mechanism is provided for throttling a fluid flowing through an opening in a body between two regions at different pressures. According to one aspect of the invention means are provided for defining first and second throttling fluid paths through said opening which means comprise at least one valve member movable with respect to said opening between a first and second position. First seat means are provided around said opening for sealingly engaging said member in the first position thereof to close the first flow path. Said first flow path is opened by movement of said valave member towards its second position for throttling a first flow of fluid through said opening. Means movable with said valve member between the first and second positions thereof are also provided for controlling displacement of said valve member, said movable controlling means carrying second seat means for sealingly engaging said valve member in the first and up to the second position thereof for closing said second path. Further, these controlling means are movable with respect to said valve member in said second position for opening the second flow path to throttle a second flow of fluid through said opening.

Preferably, the movable valve member is responsive to the pressure differences between the first and second regions to be urged into sealing engagement with the second seat means in the first and up to the second position thereof.

Preferably, too, the movable valve member comprises a tubular body having bearing edge portions at the respective ends thereof to come into sealing engagement with the respective first and second seat means. These bearing edge portions can be sized to define different areas bounded by their respective lines of contact with said first and second seat means so that the pressure difference between the two regions urges the movable valve member against the second seat in the first and up to the second position of the valve member for closing the second path. Thus, no mechanical connection is necessary to keep the valve member and the controlling means moving jointly between these two positions. Abutment means are also provided to retain said movable valve member in said second position while said controlling means further moves for opening the second path to throttle the second flow of fluid.

According to a further aspect of the invention the opening of the first flow path provides a section which increases non-linearly with the displacement of the controlling means whereas the opening of said second flow path provides a section which increases substantially linearly with further displacement of said controlling means.

According to another aspect of the invention wall means are preferably provided which surround said opening and have lateral throttle apertures or slots formed therein. The valve member has a lateral outer face opposite said wall means at a short distance interval therefrom to cover the throttle apertures and thus substantially obstruct them in the first position of said valve member and to progressively uncover variable sections of such apertures at a rate increasing with displacement of said valve member toward its second position. In the first position the valve member sealingly engages first seat means closing a flow path extending through the interval separating the lateral face of said valve member and said wall means and the uncovered portion of the throttle apertures. Upon further opening the section of flow path increases non linearly with the displacements of the valve member according to a relationship which is determined by the profile of the throttling apertures.

Figure 2:
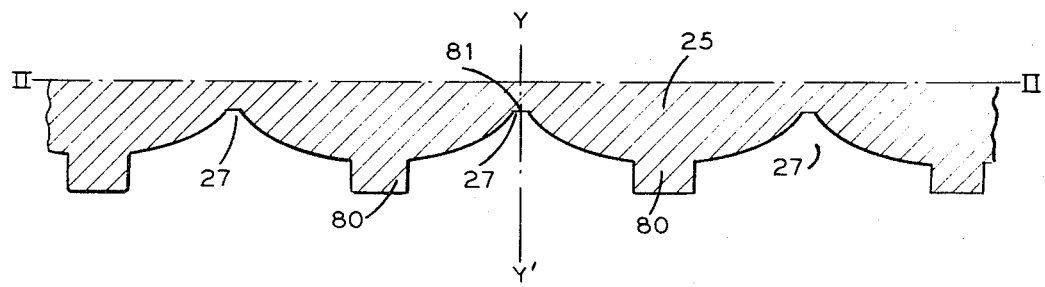

Further aspects and advantages of the invention will become apparent from the following description of an exemplary embodiment made with reference to the accompanying drawings in which:

FIG. 1 is a sectional view in elevation of the embodiment of a valve mechanism according to the invention; and FIG. 2 shows in developed form along a plane which is parallel to the axis XX' of FIG. 1 the profile of some throttling apertures formed in a wall extension 25 cut along line II — II in FIG. 1.

The valve mechanism shown by FIG. 1 has a body 10 separating two different regions 11 and 12 such as two different portions of a pipe conduit containing a pressurized fluid. When the valve is in use the pressure in region 11 is normally higher than the pressure in region 12 and the fluid flows from the region 11 to the region 12 under this difference of pressure through the valve throttling mechanism which is described hereinafter.

As shown by FIG. 1, the body member 10 defines an enclosure delimiting a portion of the region 12 and has an internally threaded reduced bore or cylindrical opening 13 formed therein about an axis XX' with an enlarged portion 14 on the end facing region 11. An annular member 15 has an outer cylindrical portion 16 threadedly engaged into the cylindrical bore 13 of the body 10. The annular member 15 has an enlarged head 17 fitted in the enlarged opening portion 14 of the body member 10, and a seal 18 is squeezed between the respective shoulder sections of the enlarged opening portion 14 and of the heat 17. The member 15 defines a cylindrical opening 20 centered on XX' and has an annular end face or bottom 21 facing toward the region 12, in which a packing element 23 of a resilient material is embedded to form an annular valve seat centered on XX'.

In the preferred embodiment described, adjacent to the seat 23 but at a greater radial distance from the axis XX', a cylindrical wall extension 25 projects from the face 21 in the direction of the region 12. This wall extension 25 has a continuous upper body portion 26 integral and concentric with the member 15 and a lower portion with a series of shaped slots or throttle apertures 27 formed therein as will be later described in further detail with reference to FIG. 2.

A movable circular plate 30 is mounted within the portion of the region 12 defined by a bore 32 of the body member 10. This plate 30 is centered perpendicular to the axis XX' and movable parallel thereto. The plate 30 is mounted on controlling shaft 34 which is secured to the center of the plate 30 by conventional nut and bolt assembly 35. The shaft 34 is movable along the axis XX' in both directions are represented by the arrows A and B, so as to drive the plate 30 back and forth in front of the opening defined by the bore 20 which communicates the regions 11 and 12. The shaft 34 is driven by a manual screw and wheel mechanism (not shown), for example, for a pressure reducing valve or automatically by a piston or membrane (not shown) as commonly found in pressure regulators and other automatically controlled valves.

The shaft 34 projects toward the region 12 from one face 36 of the plate 30. The other face 37 of the plate 30 defines a flat circular surface facing the bore 20 and having a ring 40 of resilient packing material embedded therein to form an annular valve seat, as will be explained later.

The valve mechanism of FIG. 1 further includes a movable valve member 42 which has a tubular or annular shape centered about the axis XX' and which is received slidably within cylindrical wall 25 the internal diameter of which is indicated by D3 on FIG. 1. To define an initial, narrow annular fluid path cylindrical outer wall surface 44 of the valve member 42 is spaced inwardly from the confronting surface of the wall extension 25 by only a short interval indicated by reference 46 on the drawing. The annular valve member 42 also has an inner cylindrical wall surface 48 centered about the axis XX'. The lower end 49 of the annular valve member 42 is beveled so as to form a sharp edge or lip 50 bearing in a first position illustrated by FIG. 1 against the annular valve seat 40 on the surface 37 of the plate 30. The bearing edge 50 is formed by the end of the cylindrical inner wall 48, the diameter of which is represented on the drawings by $D_1$.

At the other end of the annular valve member 42, there is another bearing edge or lip 52 which is formed by a beveled annular protusion on top end surface 53 of the valve member 42. In the position shown in FIG. 1, this bearing edge 52 is in sealing engagement with the valve seat 23 in the bottom face 21 of the member 15. The diameter of this bearing edge 52 is indicated by $D_2$ on FIG. 1 and is larger than $D_1$ to encompass a larger area. When the pressure $P_1$ in the region 11 and inside the bore 20 is greater than the pressure $P_2$ in the region 12, the pressure differential $P_1-P_2$ multiplied by the difference in areas yields a force tending to apply the valve member 42 axially against the plate 30.

Displacements of the valve member 42 in the direction of the arrow B may be limited by an internal flange 55 extending inwardly from the inner cylindrical surface 48 of the valve member 42 adjacent to the upper end 53 thereof. Flange 55 is engageable, after a prescribed axial movement away from valve seat 23, by an annular abutment member 60 centered about the axis XX'. Member 60 has one end 62 toward the region 11 threadedly secured to the member 15.

The cylindrical bore defined by the inner wall portion 63 of this abutment member 60 forms an extension to the bore 20 generally coextensive with wall extension 25. A series of openings 65 are provided in the wall portion 63 of the abutment member 60 opposite apertures 27 in wall extension 25. Spaced above the upper surface 37 of the plate 30 and extending outwardly at the adjacent end of the abutment member 60 is a flange 67 against which the inwardly extending flange 55 abuts in the lowermost or second position of the valve member 42. The flange 55 has an internal diameter which is slightly greater than the outer diameter of the wall portion 63 of the abutment member 60 so as to provide an ample annular clearance 70 therebetween through which the fluid can flow even in the first (upper) position of member 42.

Referring back to the mechanism in the first position, illustrated by FIG. 1, it will be observed that the span space inside the bore 20, the annular abutment member 60, and the movable valve member 42 and above the plate 30 is at the pressure $P_1$ of the region 11. A first flow path between the regions 11 and 12 defined by that open space, the lateral clearance 70, the clearance between faces 21 and 53, the clearance 46 and the apertures 27 is closed due to the sealing engagement of the bearing edge 52 and the valve seat 23. A second flow path comprising the same open space and the clearance between the plate 30 and the lower ends of the abutment member 60 and the valve member 42 is closed by the sealing engagement of the lower bearing edge 50 with the valve seat 40 on the plate 30. Moreover, in the first position, illustrated by FIG. 1, the outer portion 44 of the valve member 42 entirely covers or overlaps the apertures 27 formed in the wall extension 25.

Turning now to the developed view of FIG. 2, the configuration of three typical ones of these apertures 27 is shown, each of them symmetrically contoured with respect to a generatrix such as YY'. These apertures are effectively terminated at the top of further extensions 80 of the wall 25 which serve to guide the longitudinal movements of the movable valve member 42 in the directions of arrows A and B. As extensions 80 lie below the upper surface 53 of the valve member 42 in its lowermost (second) position, their lateral edges may be straight and parallel, below apertures 27, without effect upon flow rate. It will also be noted that the lower ends of the extensions 80 and of the abutment member 60 substantially lie in same plane perpendicular to the axis XX'.

To provide the desired control of relatively low flow rates, each aperture 27 has a squared top portion 81 from which the section of the aperture enlarges in the direction of arrow B. The profile of these openings, illustrated by FIG. 2, is exponential so as to define as one moves along the generatrix YY' a narrow groove which progressively flares from portion 81 down to the extension 80, the lateral edges of these guide extensions 80 being parallel. It will be understood that as the valve member 42 moves from the first position illustrated by FIG. 1 toward the second position where the flange 55 abuts against the flange 67, the outer wall portion 44 of the member 42 will progressively uncover wider sections of the openings 27. Due to the particular shape of these openings 27, the increment in the section uncovered by a given incremental unit of displacement of the valve member 42 in the direction of a rrow B is much smaller when the valve member 42 is still in the vicinity of its first closing position shown in FIG. 1 than that uncovered by the displacement of the member 42 by the same unit of displacement when the member is close to its second, abutment position at the end of its travel path in the direction of arrow B. In the present example, the profile illustrated by FIG. 2 provides that for any given axial displacement of the member 42, the percentage increase in the uncovered section of the throttle apertures 27 remains constant throughout the travel path of member 42.

Due to the fact that only a narrow groove is provided at the top 81 of the apertures 27, effective throttling can be obtained from apertures 27 uncovered by a limited opening of the valve member 42 in the direction of arrow B even for low flow rates.

In the closing position illustrated by FIG. 1, the movable valve member 42 is subjected to a force in the direction of arrow B having a value $F_1 = (P_1 - P_2)(S_2 - S_1)$, $S_1$ and $S_2$ designating, respectively, the areas defined by the circles of diameters $D_1$ and $D_2$. As explained before, this force $F_1$ tends to apply the valve member 42 against the plate 30.

In operation, assuming that the pressure $P_1$ is greater than pressure $P_2$ and that the shaft 34 has been moved by a small amount in the direction of arrow B so as to open a passage between bearing edge 52 and seat 23, the fluid flowing through the bore 20 will be throttled through the first flow path previously defined including the space between the bearing edge 52 and the seat 23 and even more important the narrow clearance interval 46 between the valve member 42 and the wall extension 25. The throttling section defined by this interval 46 may be as small as a few square millimeters and it will be seen that at the beginning of the displacement of the member 42 from the first position of FIG. 1 in the direction of the arrow B, the force acting on such member 42 to apply it in sealing engagement against the plate 30 will then be approximately $F_2 = (P_1 - P_2)(S_3 - S_1)$, $S_3$ here being the surface of the circular area of diameter $D_3$. This force $F_2$ continues to be applied until the upper end surface 53 of the valve member 42 passes below the top portion 81 of the openings 27 during the displacement of the valve member 42 in the direction of the arrow B. As soon as this happens, the throttle apertures 27 begin to be uncovered by the outer lateral wall portion 44 of the movable member 42. Then, the section of the first flow path defined above increases exponentially with the amount of downward travel by which these apertures are uncovered. The fluid flowing through them is throttled and subjected to a head loss corresponding to the pressure difference between the regions 11 and 12 for the particular flow rate established. During further downward movement of the shaft 34 and associated plate 30, the movable valve member 42 is held by pressure differential against the plate 30 the apertures 27 are completely uncovered, and the valve member 42 comes into a second rest position by abutment of the flange 55 against the flange 67 of the abutment member 60. It may be seen that in the latter position, the first flow path is constituted by almost direct communication between the openings 65 and the full apertures 27, the total flow section of the latter apertures being smaller than the total flow section provided by the openings 65. From this rest position of the valve member 42, if the movement of the shaft 34 and the associated plate 30 goes on in the direction of arrow B, a second flow path, previously defined, opens up as the seat 40 carried by the plate 30 becomes separated from the bearing edge 50 of the movable valve member 42. The smallest section of such second flow path is defined by the annular space between the edge 50 and the seat 40. It may be seen that such section increases linearly with further displacements of the movable assembly 30–34 in the direction of the arrow B.

Thus as the assembly 34, 30 moves in the direction of arrow B from the position shown by FIG. 1, a first flow path is opened through which the fluid flowing between regions 11 and 12 is throttled, the section of such flow path increasing non-linearly, i.e., exponentially with the displacement of the movable assembly. As the first flow path reaches its maximum dimension, the second flow path opens and the section of such flow path then increases linearly with further displacement of the movable assembly in the same direction.

As the movable assembly starts moving back in the direction of arrow A from its lowermost position, the sections of the second and then the first flow path vary in the opposite way, with closing of the second flow path occurring first and then of the first flow path by engagement of the bearings 50 and 52 of the movable valve member with their respective seats.

It should be observed here that during the whole travel of the movable valve member 42 in the direction B from the closing position of the first flow path to the point of opening the second flow path, the movable valve member 42 has been maintained in contact with the plate 30 by the sole effect of the pressure differential on such valve member. In other words, a very simple arrangement has been provided between movable member 42 and the movable assembly 34, 30. This movable assembly is subjected to differential pressure forces from the two regions 11 and 12 and to the action of any control mechanism to which the shaft 34 may be connected. The position of the movable valve member 42 is, in turn, controlled by the displacements of the movable assembly 30, 34. It will be noted that the previously described arrangement provides for simple mounting of the mechanism and makes excess axial loading or binding of the movable parts unlikely, the engagement between them resulting from the direct action of the pressure forces involved in the throttling process.

More generally, it should be said that a throttling valve mechanism has been provided which allows effectively controlled throttling of fluid flowing between two regions over an entire flow range including flow rates in the vicinity of zero.

Various relationships between the flow section and displacements of the movable parts may be modified, and persons skilled in the art will know how to adapt the profile of the throttling apertures such as 27 to obtain other desired relationships.

It should also be understood that various changes and modifications may be brought to the embodiment described without departing from the spirit of the invention as defined in the annexed claims.

What is claimed is:

1. A valve mechanism for throttling a flowing fluid comprising:
   a body having an opening for providing fluid communication between two regions at different pressures;
   means for defining first and second throttling flow paths through said opening and comprising at least one tubular valve member longitudinally movable with respect to said body between a first and a second position and having first and second longitudinally spaced bearing portions;
   first seat means around said opening for sealingly engaging said first bearing portion of said tubular valve member in the first position thereof to close said first flow path, said first flow path being opened by movement of said valve member toward said second position for throttling a first flow of fluid through said opening;
   means movable with said valve member between the first and second positions thereof for controlling displacement of said valve member;
   second seat means on said controlling means for sealingly engaging said second bearing portion of said tubular valve member in the first and up to the second position thereof for closing said second flow path;
   said controlling means being movable with respect to said valve member in said second position for opening said second flow path to throttle a second flow of fluid through said opening.

2. The valve mechanism of claim 1 wherein said flow path defining means are operatively arranged to provide a non-linearly increasing flow section for said first flow path upon at least a partial displacement of said tubular valve member from the first to the second position thereof.

3. The valve mechanism of claim 2 wherein the rate of increase of the flow section of said first flow path increases with at least part of the displacement of said tubular valve member from the first to the second position thereof.

4. The valve mechanism of claim 3 wherein said flow path defining means are operatively arranged to provide a linearly increasing flow section for said second flow path upon movement of said controlling means with respect to said tubular valve member in the second position thereof.

5. The valve mechanism of claim 2 wherein said tubular valve member is responsive to a pressure difference between the two regions for being urged in sealing engagement against said second seat means in the first and up to the second position of said tubular valve member.

6. The valve mechanism of claim 5 further including abutment means for holding said tubular valve member in the second position thereof.

7. The valve mechanism of claim 1 wherein said first and second bearing portions define areas of different values bounded by their respective lines of contact with said first and second seat means for causing said tubular valve member to be urged in the direction from said first to second position in response to a pressure difference between the two regions.

8. The valve mechanism of claim 1 further including a tubular wall member longitudinally projecting from said body around the opening inside said tubular valve member and having lateral flow openings formed therein,
   said tubular wall member and said tubular valve member further including abutment means for retaining said tubular valve member in said second position for opening of said second flow path with said lateral openings forming a portion of said first flow path.

9. A valve mechanism for throttling a flowing fluid comprising:
   a body having an opening for providing fluid communication between two regions at different pressures;
   means for defining first and second throttling flow paths through said opening and comprising a wall member surrounding said opening and at least one valve member movable with respect to said body between a first and a second position, said valve member having a face movable opposite a face of said wall member at a short distance therefrom and wherein one of said wall and valve members has throttling apertures formed in its face, the other face substantially covering said throttling apertures in the first position of said valve member and being adapted to progressively uncover variable sections of said apertures upon displacement of said valve member to said second position, at least a portion of said first flow path being formed by the interval between said opposite faces and by any uncovered portion of said throttling apertures for throttling a first flow of fluid through said opening, the profile of said apertures determining a non-linear relationship between the uncovered sections of said throttling apertures and the corresponding displacement of said valve member;

first seat means around said opening for sealingly engaging said valve member in the first position thereof to close said first flow path;

means movable with said valve member between the first and second positions thereof controlling displacement of said valve member;

second seat means on said controlling means for sealingly engaging said valve member in the first and up to the second position thereof for closing said second flow path;

said controlling means being movable with respect to said valve member in said second position for opening said second flow path to throttle a second flow of fluid through said opening.

10. The valve mechanism of claim 9 wherein said wall member projects from said body around said opening and has said throttling apertures formed therein, said valve member includes a tubular wall portion longitudinally movable within said wall member and having first and second longitudinally spaced apart bearing portions for sealingly engaging said first and second seat means respectively in the first position of said valve member, and said first and second bearing portions define different areas bounded by their respective lines of contact with said first and second seat means for causing said tubular wall portion to be urged in the direction from said first to second position in response to the pressure difference between the two regions.

* * * * *